United States Patent
Lim et al.

(10) Patent No.: US 9,113,496 B2
(45) Date of Patent: Aug. 18, 2015

(54) METHOD AND APPARATUS FOR TRANSCEIVING DATA IN A WIRELESS ACCESS SYSTEM

(75) Inventors: Dongguk Lim, Anyang-si (KR); Hangyu Cho, Anyang-si (KR); Seunghyun Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 13/643,294

(22) PCT Filed: Apr. 25, 2011

(86) PCT No.: PCT/KR2011/003001
§ 371 (c)(1),
(2), (4) Date: Oct. 24, 2012

(87) PCT Pub. No.: WO2011/136524
PCT Pub. Date: Nov. 3, 2011

(65) Prior Publication Data
US 2013/0039262 A1 Feb. 14, 2013

Related U.S. Application Data

(60) Provisional application No. 61/327,715, filed on Apr. 25, 2010.

(30) Foreign Application Priority Data

Apr. 25, 2011 (KR) ................. 10-2011-0038425

(51) Int. Cl.
H04W 84/04 (2009.01)
H04B 7/155 (2006.01)
H04W 40/00 (2009.01)
H04W 40/22 (2009.01)

(52) U.S. Cl.
CPC ............. H04W 84/047 (2013.01); H04B 7/155 (2013.01); H04W 40/00 (2013.01); H04W 40/22 (2013.01)

(58) Field of Classification Search
None
See application file for complete search history.

(56) References Cited

U.S. PATENT DOCUMENTS

2008/0013459 A1* 1/2008 Do et al. .................. 370/248
2008/0043647 A1* 2/2008 Yoshida et al. ............ 370/280
(Continued)

FOREIGN PATENT DOCUMENTS

WO 2009145484 12/2009

OTHER PUBLICATIONS

Larissa Popova et al., "Cooperative mobile-to-mobile file dissemination in cellular networks within a unified radio interface", Computer Networks, vol. 52, pp. 1153-1165, Apr. 2008.
(Continued)

*Primary Examiner* — Ian N Moore
*Assistant Examiner* — Eric H Wang
(74) *Attorney, Agent, or Firm* — Lee, Hong, Degerman, Kang & Waimey

(57) ABSTRACT

The present invention relates to a method which involves determining a relay terminal in an M2M communication system, and transceiving data to/from a base station or other terminal through the determined relay terminal, and to a method for constructing frames for transceiving data in the M2M communication system. By means of the data-transceiving method, an M2M terminal can transmit/receive a signal to/from a base station or other M2M terminal, and frames of a base station and M2M terminal can be efficiently constructed, wherein said method includes: receiving, by a first terminal of a wireless access system, a first message including a relay operation parameter, which is information that indicates a transmitting or receiving operation, from a base station during a downlink section and/or uplink section within a frame; and transceiving, by the first terminal, data to/from the base station or other terminal on the basis of the received relay operation parameter.

8 Claims, 17 Drawing Sheets

(56) References Cited

U.S. PATENT DOCUMENTS

| | | | |
|---|---|---|---|
| 2010/0002631 A1* | 1/2010 | Cho et al. | 370/328 |
| 2010/0056067 A1* | 3/2010 | Kim et al. | 455/69 |
| 2010/0157826 A1* | 6/2010 | Yu et al. | 370/252 |
| 2013/0003646 A1* | 1/2013 | Michel et al. | 370/315 |
| 2013/0012191 A1* | 1/2013 | Charbit et al. | 455/422.1 |

OTHER PUBLICATIONS

IEEE, IEEE Standard for Local and Metropolitan Area Networks, "Part 16: Air Interface for Broadband Wireless Access Systems—Amendment 1: Multihop Relay Specification", IEEE Std 802.16j-2009, Jun. 2009.

Huang Lin et al., "Capacity Analysis of Dedicated Fixed and Mobile Relay in LTE-Advanced Cellular Networks", Proceedings of International Conference on Communications Technology and Applications, Oct. 2009.

PCT International Application No. PCT/KR2011/003001, Written Opinion of the International Searching Authority dated Jan. 2, 2012, 16 pages.

* cited by examiner

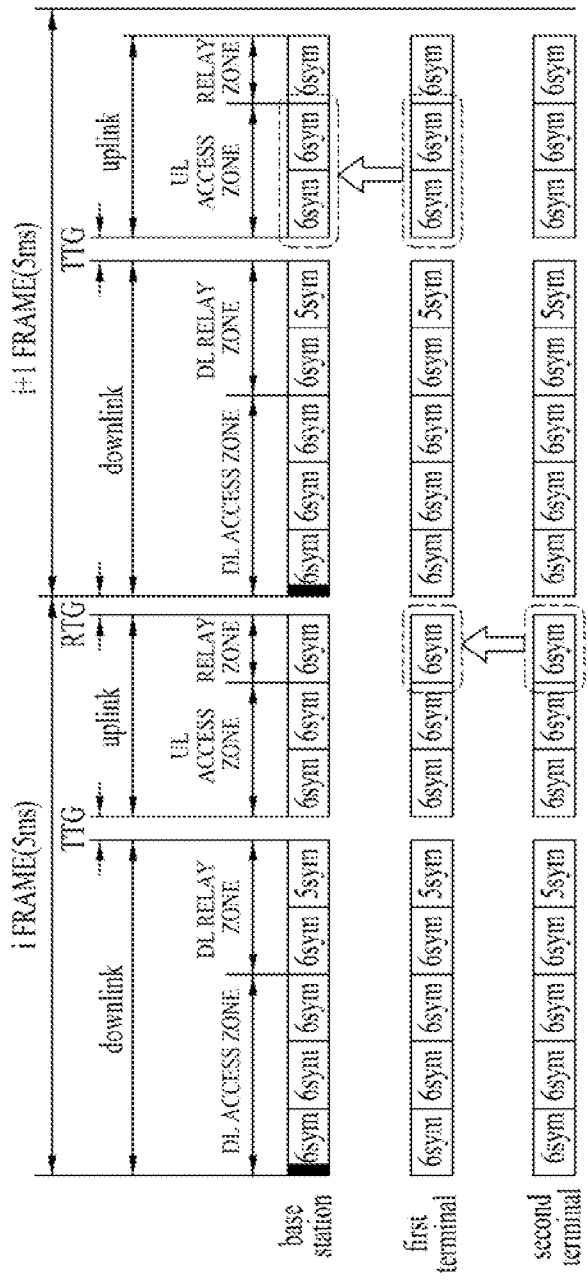

METHOD AND APPARATUS FOR TRANSCEIVING DATA IN A WIRELESS ACCESS SYSTEM

CROSS-REFERENCE TO RELATED APPLICATIONS

This application is the National Stage filing under 35 U.S.C. 371 of International Application No. PCT/KR2011/003001, filed on Apr. 25, 2011, which claims the benefit of earlier filing date and right of priority to Korean Patent Application No. 10-2011-0038425, filed on Apr. 25, 2011 and also claims the benefit of U.S. Provisional Application Ser. No. 61/327,715, filed on Apr. 25, 2010, the contents of which are all hereby incorporated by reference herein in their entirety.

TECHNICAL FIELD

The present invention relates to a wireless access system and more specifically, to a method and apparatus for transceiving data to/from a base station and other terminal in a machine-to-machine (M2M) communication system.

BACKGROUND ART

FIG. 1 illustrates an exemplary frame structure supported by 802.16 systems.

Referring to FIG. 1, a superframe (SF) includes a superframe header (SFH) and 4 frames F0, F1, F2 and F3. The frames in the superframe may have the same duration. While each super frame is 20 ms and each frame is 5 ms in FIG. 1, the sizes of the superframe and frame are not limited thereto. The duration of a superframe, the number of frames included in a superframe, and the number of subframes included in a frame may vary. The number of subframes included in a frame may depend on channel bandwidth, the duration of a cyclic prefix (CP), etc.

A frame includes a plurality of subframes SF0, SF1, SF2, SF3, Sf4, SF5, SF6 and SF7. Each subframe may be used for uplink or downlink transmission. A subframe includes a plurality of orthogonal frequency division multiplexing (OFDM) symbols or orthogonal frequency division multiple access (OFDMA) symbols in the time domain and includes a plurality of subcarriers in the frequency domain.

An OFDM symbol represents a symbol period and may be referred to as an OFDMA symbol, SC-FDMA symbol, etc. according to multiple access scheme. While a subframe is composed of 5, 6, 7 or 9 OFDMA symbols, the number of OFDMA symbols included in a subframe is not limited. The number of OFDMA symbols included in a subframe may depend on channel bandwidth, the duration of a CP, etc.

The type of a subframe may be defined according to the number of OFDMA symbols included in the subframe. For example, a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes of the same type. Otherwise, one frame may include subframes of different types. That is, subframes included in a frame may have the same number of OFDMA symbols or different numbers of OFDMA symbols. Otherwise, the number of OFDMA symbols included in at least one subframe in a frame may differ from the number of OFDMA symbols of other subframes in the frame.

Time division duplexing (TDD) or frequency division duplexing (FDD) may be applied to frames. Subframes are used for uplink transmission or downlink transmission at the same frequency in different time periods in the TDD scheme. That is, subframes in a TDD frame are divided into uplink subframes and downlink subframes in the time domain. In the FDD scheme, subframes are used for uplink transmission or downlink transmission at different frequencies in the same time period. That is, subframes included in an FDD frame are divided into uplink subframes and downlink subframes in the frequency domain. Uplink transmission and downlink transmission may be simultaneously performed while respectively occupying different frequency bands.

An SFH may carry an essential system parameter and system configuration information. The SFH may be located in the first subframe of a superframe. The SFH may occupy the last 5 OFDMA symbols in the first subframe.

The SFH may be classified into a primary SFH (P-SFH) and a secondary SFH (S-SFH). The P-SFH and S-SFH may be transmitted in each superframe. The S-SFH may be transmitted in two contiguous superframes. Information transmitted through the S-SFH may be divided into 3 sub-packets S-SFH SP1, S-SFH SP2 and S-SFH SP3. The sub-packets may be periodically transmitted at different intervals. Information transmitted through the sub-packets S-SFH SP1, S-SFH SP2 and S-SFH SP3 may have different degrees of importance. S-SFH SP1 may be transmitted at the shortest interval and S-SFH SP3 may be transmitted at the longest interval.

S-SFH SP1 includes information about network, re-entry, S-SFH SP2 includes information about initial network entry and network discovery. S-SFH SF3 includes other important system information.

An OFDMA symbol includes a plurality of subcarriers, and the number of subcarriers is determined according to FFT size. Subcarriers may be classified into a data subcarrier for data transmission, a pilot subcarrier for various estimations, and a null carrier for a guard band and DC carrier.

Machine to machine (M2M) communication will now be described.

M2M communication refers to communication between electronic devices. In a broad sense, M2M communication means wired or wireless communication between electronic devices or communication between devices controlled by people. Recently, M2M communication generally refers to wireless communication between electronic devices, performed without human intervention. Performance or capability of M2M terminals used in a cellular network is poorer than that of general terminals.

An M2M environment has the following characteristics: 1) a large number of terminals per cell; 2) a small quantity of data; 3) low frequency of transmission; 4) a limited number of data characteristics; and 5) insensitiveness to time delay.

M2M terminals in a cell, which have the above-mentioned characteristics, may transmit/receive signals to/from other M2M terminals or a base station using a multi-hop configuration or a hierarchical structure.

However, a scheme for transmitting/receiving data to/from a base station or other terminal is not provided when M2M terminals have a multi-hop configuration or hierarchical structure in a current M2M communication system.

DISCLOSURE

Technical Problem

An object of the present invention is to provide a method for determining a relay terminal and transmitting/receiving data to/from a base station or other terminal through the determined relay terminal in an M2M communication system.

Another object of the present invention is to provide a method for constructing frames for transmission and reception of data when devices have a hierarchical structure or a multi-hop structure in an M2M communication system.

Technical Solution

According to an aspect of the present invention, a method for transceiving data by a terminal performing a relay operation in a wireless access system includes: receiving a first message including a relay operation parameter from a base station; and transceiving data to/from the base station or other terminal on the basis of the received relay operation parameter, wherein the relay operation parameter is information that indicates a transmitting operation or a receiving operation in at least one of a downlink section and an uplink section in a frame.

The terminal and the other terminal may be M2M terminals that support M2M communication.

The first message may further include switching period information that indicates switching of the transmitting operation or receiving operation determined by the relay operation parameter on a frame-by-frame basis or superframe-by-superframe basis.

The first message may include at least one of information about a lower terminal, information about a switching gap, information about resource allocation, pilot signal information, connection ID for relay, and flow ID for relay, in the case of multi-hop relay.

The method may further include receiving an M2M relay operation trigger signal from the base station; and transmitting a response signal for the received M2M relay operation trigger signal to the base station.

The response signal may include at least one of a channel quality indicator, channel state information, a signal-to-interference plug noise ratio, an interference level, path loss, and a relay support indicator.

The method may further include transmitting a link measurement signal to the other terminal; receiving link information measured according to the link measurement signal from the other terminal; setting a link transmission parameter on the basis of the received link information; and transmitting an M2M relay request message to the base station, wherein the M2M relay request message includes an M2M relay confirmation indicator indicating that the terminal is ready to perform M2M relay.

The method may further include transmitting a link measurement signal to the other terminal; receiving link, information measured according to the link measurement signal from the other terminal; transmitting the received link information to the base station through an M2M relay request message; and receiving an M2M relay response message from the base station, wherein the M2M relay response message includes a link transmission parameter and an M2M relay confirmation indicator indicating that the terminal is ready to perform M2M relay. The relay operation parameter may indicate a receiving operation to receive data from the base station in a downlink section of a first frame and a transmitting operation to transmit the data received in the downlink section of the first frame to the other terminal in a downlink section of a second frame.

The relay operation parameter may indicate a receiving operation to receive data from the other terminal in an uplink section of a first frame and a transmitting operation to transmit the data received in the uplink section of the first frame to the base station in an uplink section of a second frame.

The relay operation parameter may indicate a receiving operation to receive data from the base station in a downlink section of a first frame, a receiving operation to receive data from the other terminal in an uplink section of the first frame, a transmitting operation to transmit the data received in the downlink section of the first frame to the other terminal in a downlink section of a second frame, and a transmitting operation to transmit the data received in the uplink section of the first frame to the other terminal in an uplink section of the second frame.

The relay operation parameter may indicate a receiving operation to receive data from the base station in a downlink section of a first frame, a transmitting operation to transmit the data received in the downlink section of the first frame to the other terminal in an uplink section of the first frame, a receiving operation to receive data from the other terminal in a downlink section of a second frame, and a transmitting operation to transmit the data received in the downlink section of the second frame to the base station in an uplink section of the second frame.

The relay operation parameter may indicate a receiving operation to receive data from the base station in a superframe header transmission period.

The relay operation parameter may indicate a receiving operation to receive relay control information from the base station in a downlink section of each frame, wherein the relay operation parameter indicates a receiving operation to receive data from the other terminal in an uplink section of a first frame and a transmitting operation to transmit the data received from the other terminal to the base station in an uplink section of a second frame.

The relay operation parameter may indicate a receiving operation to receive data from the base station in a downlink section of each frame, wherein the relay operation parameter indicates a receiving operation to receive data from the other terminal in an uplink section of a first frame and a transmitting operation to transmit the data received from the other terminal to the base station in an uplink section of a second frame.

The downlink section may be divided into a downlink access zone and a downlink relay zone, and a signal to be transmitted to the other terminal may be received through the downlink relay zone.

The uplink section may be divided into an uplink access zone and an uplink relay zone, and a signal to be transmitted to the base station may be received through the uplink relay zone.

The relay operation parameter may indicate a receiving operation to receive data from the base station in a downlink section of a first frame, a transmitting operation to transmit the data received in the downlink section of the first frame to the other terminal in an uplink section of the first frame, a transmitting operation to transmit data to the base station in a downlink section of a second frame and a receiving operation to receive data from the other terminal in an uplink section of the second frame, wherein each downlink section is divided into a downlink access zone and a downlink relay zone and each uplink section is divided into an uplink access zone and an uplink relay zone.

According to another embodiment of the present invention, a terminal performing a relay operation in a wireless access system includes: an RF communication unit for transceiving an RF signal; and a controller connected to the RF communication unit, wherein the controller controls the RF communication unit to receive a first message including a relay operation parameter from a base station and to transceive data to/from the base station or other terminal on the basis of the received relay operation parameter, wherein the relay operation parameter is information that indicates a transmitting operation or a receiving operation in at least one of a downlink section and an uplink section in a frame.

The terminal and the other terminal may be M2M terminals.

Advantageous Effects

According to the embodiments of the present invention, an M2M terminal can transmit/receive a signal to/from a base station or other M2M terminal according to a message including information about frame construction and operation.

Furthermore, it is possible to efficiently construct frames of the base station and the M2M terminal according to the message taking characteristics of M2M communication into account.

DESCRIPTION OF DRAWINGS

FIGS. 15(a) and 15(b) illustrate operations of a base station and mobile terminals in a frame configuration in M2M communication according to another embodiment of the present invention.

BEST MODE

The following technique can be used for a variety of wireless communication systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and E-UTRA (Evolved UTRA). IEEE 802.16m is an evolved version of IEEE 802.16e and provides backward compatibility with IEEE 802.162 based systems.

UTRA is a part of the Universal Mobile Telecommunications System (UMTS). 3GPP LTE is a part of the E-UMTS (Evolved UMTS), which uses E-UTRA. 3GPP LTE employs OFDMA in downlink and employs SC-FDMA in uplink. LTE-A is an evolved version of 3GPP LTE.

For clarity, the following description focuses on IEEE 802.16m. However, technical features of the present invention are not limited thereto.

Terms used in an M2M system are defined.

(1) Machine-to-Machine (M2M) Communication: information exchange between user devices through a base station or between a server and a device in a core network through a base station, performed without human intervention.

(2) M2M ASN: access service network capable of supporting the M2M service.

(3) M2M Device: terminal having (or supporting) the M2M function.

(4) M2M Subscriber: M2M service user equipment (UE).

(5) M2M Server: entity capable of communicating with an M2M device, which provides an interface accessible by an M2M subscriber.

(6) M2M Feature: feature of an M2M application supported by M2M ASN. One or more features may be needed to support the M2M application.

(7) M2M Group: group of M2M terminals including a common M2M subscriber and/or the same M2M subscriber, that is, sharing one or more features.

Figure 1:
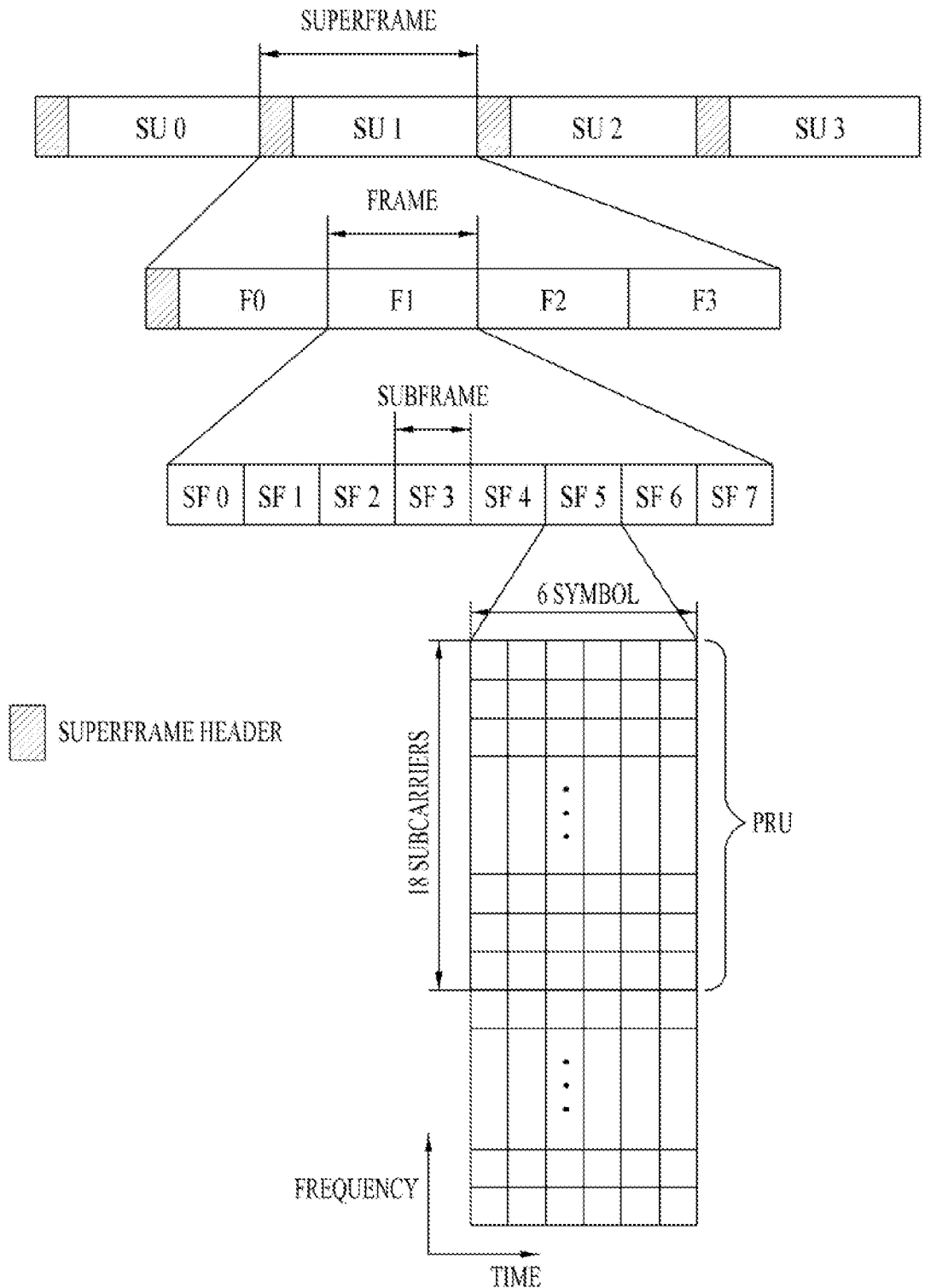
FIG. 1 illustrates an exemplary frame structure in an 802.16m system.
Figure 2:
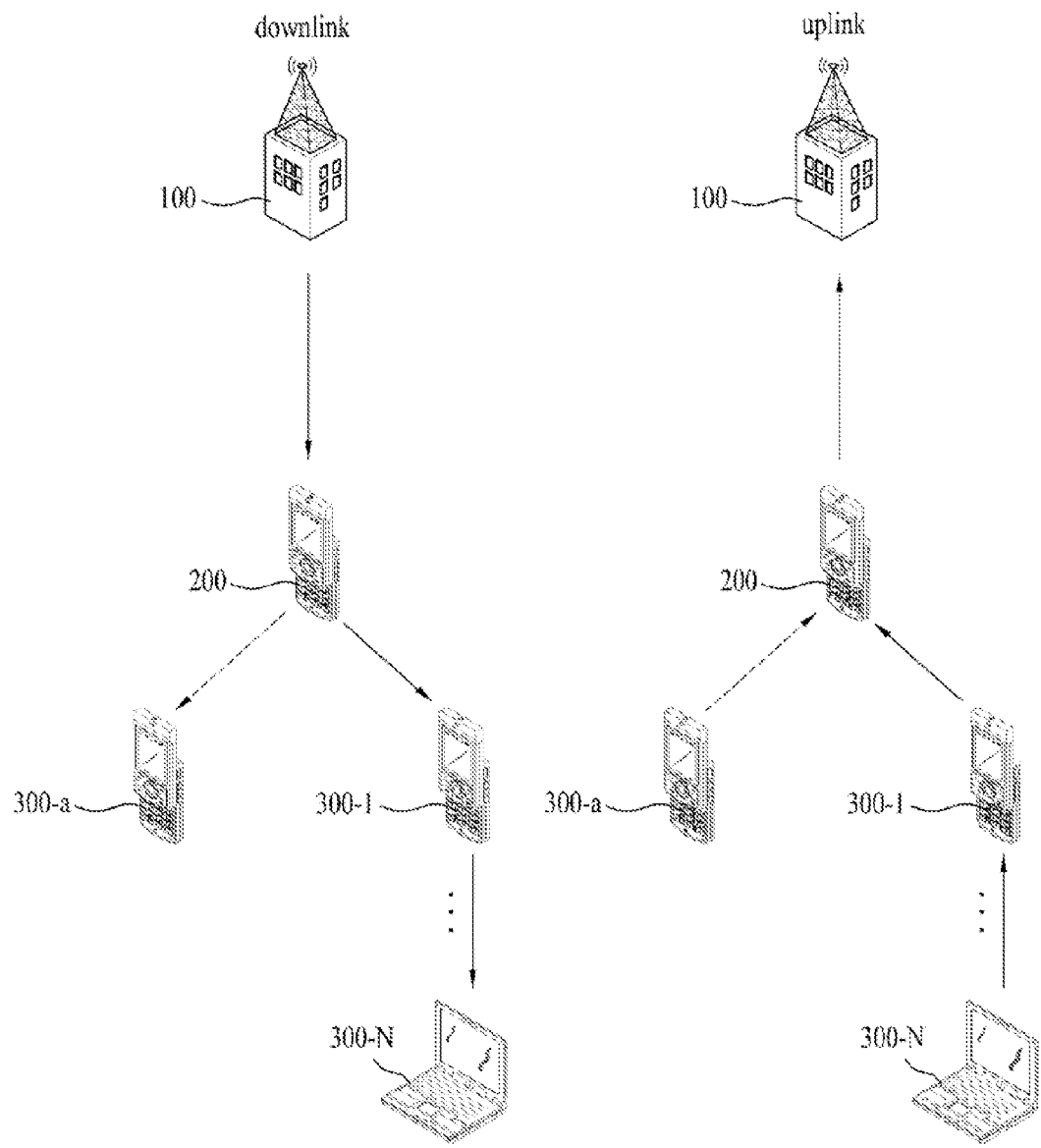
FIG. 2 illustrates an exemplary M2M communication system according to an embodiment of the present invention.

FIG. 2 illustrates an exemplary M2M communication system according to an embodiment of the present invention.

Referring to FIG. 2, the M2M communication system may include a base station 100, a first terminal 200, and second terminals 300a and 300-1 to 300N.

Here, the first terminal and the second terminals refer to terminals supporting M2M communication.

The first terminal and the second terminals may be fixed or have mobility. The first terminal and the second terminals may be referred to as user equipments (UEs), user terminals (UTs), wireless devices, advanced mobile stations (AMSs), etc.

The base station refers to a fixed station communicating with a terminal and may be referred to as a nodeB, a base transceiver system (BTS), an access point (AP), etc. One base station may include one or more cells.

The M2M communication system may be an OFDM/OFDMA based system.

OFDM uses a plurality of orthogonal subcarriers. OFDM uses orthogonality between inverse fast Fourier transform (IFFT) and fast Fourier transform (FFT). A transmitter performs IFFT on data and transmits the data to a receiver. The receiver restores the original data by performing FFT on the received data. The transmitter uses IFFT in order to combine multiple subcarriers and the receiver uses FFT corresponding to IFFT in order to separate the multiple subcarriers.

A slot is a minimum data allocation unit and is defined as a time and a subchannel. A subchannel may be composed of a plurality of tiles in uplink. A subchannel includes 6 tiles. One burst may be composed of 3 OFDM symbols and one subchannel in uplink.

In partial usage of subchannel (PUSC) permutation, each tile may include 4 contiguous subcarriers on 3 OFDM symbols. Optionally, each tile may include 3 contiguous subcarriers on 3 OFDM symbols. A bin includes 9 contiguous subcarriers on an OFDM symbol. A band refers to a group of bins in 4 rows and an adaptive modulation and coding (AMC) subchannel is composed of 6 contiguous bins in the same band.

Referring to FIG. 2, the base station 100, the first terminal 200 and the second terminals 300-a and 300-1 to 300-N may be linked through a wired/wireless communication network. The first terminal 200 directly receives a signal from the base station 100 and relays the received signal. Any terminal included in the M2M communication system may be selected as the first terminal 200 as necessary. Terminals other than the first terminal 200 from among M2M terminals may be referred to as second terminals 300.

According to an embodiment of the present invention, the base station 100 may transmit a signal to the first terminal 200. The first terminal 200 may receive the signal from the base station 100 and transmit the received signal to the second terminals 300a and 300-1 to 300N. That is, the base station 100, the first terminal 200 and the second terminals 300a and 300-1 to 300N can transmit signals using a hierarchical or multi-hop structure.

For example, the first terminal 200 can receive a signal transmitted from the base station 100 and transmit the received signal to the second terminals 300a and 300-1 to 300N in downlink. In this case, the second terminal 300-1 can transmit the signal received from the first terminal 200 to other second terminals 300-1 and 300-2 to 300-N. The first terminal 200 corresponding to a higher layer can receive signals transmitted from the second terminals 300a and 300-1 to 300N corresponding to lower layers and transmit the received signals to the base station 100 in uplink.

Figure 3:
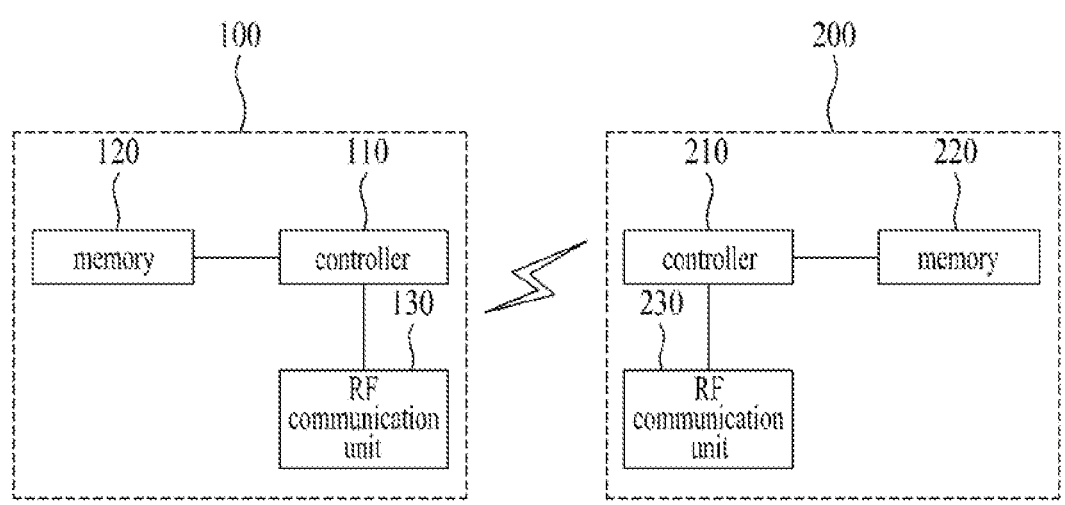
FIG. 3 is a block diagram of a terminal and a base station constructing an M2M communication system according to an embodiment of the present invention.

FIG. 3 is a block diagram of the base station 100 and the terminal 200, which construct the M2M communication system according to an embodiment of the present invention.

The terminal 200 includes a controller 210, a memory 220 and an RF unit 230.

While FIG. 3 shows the block diagram of the first terminal 200 shown in FIG. 2, the block diagram may also be applied to the second terminals shown in FIG. 2.

The terminal 200 further includes a display unit, a user interface unit, etc.

The controller 210 performs proposed functions, procedures and/or methods. RF interface protocol layers may be implemented by the controller 210.

The memory 220 is connected to the controller 210 and stores a protocol or parameters for RF communication. That is, the memory 220 stores a terminal operating system, applications and general files.

The RF unit 230 is connected to the controller 210 and transmits/receives RF signals.

Additionally, the display unit may display information about the terminal 200. The display unit may use a known element such as a liquid crystal display (LCD), organic light emitting diode (OLED) or the like. The user interface unit may be configured in the form of a combination of known user interfaces such as a keypad, touchscreen, etc.

The base station 100 includes a controller 110, a memory 120, and an RF unit 130.

The controller 110 performs proposed functions, procedures and/or methods. RF interface protocol layers may be implemented by the controller 110.

The memory 120 is connected to the controller 110 and stores a protocol or parameters for RF communication.

The RF unit 130 is connected to the controller 110 and transmits/receives RF signals.

The controllers 110 and 210 may include an application-specific integrated circuit (ASIC), different chip-sets, a logic circuit and/or a data processing apparatus. The memories 120 and 220 may include a read-only memory (ROM), a random access memory (RAM), a flash memory, a memory card, a storage medium, and/or other storage device. The RF units 130 and 230 may include a baseband circuit for processing RF signals. When the embodiment is implemented as software, the above-described technique may be embodied by modules (procedures, functions, etc.). The modules may be stored in the memories 120 and 220 and executed by the controllers 110 and 210.

The memories 120 and 220 may be located inside or outside the controllers 110 and 210 and connected to the controller 110 and 210 through various known means.

Figure 4:
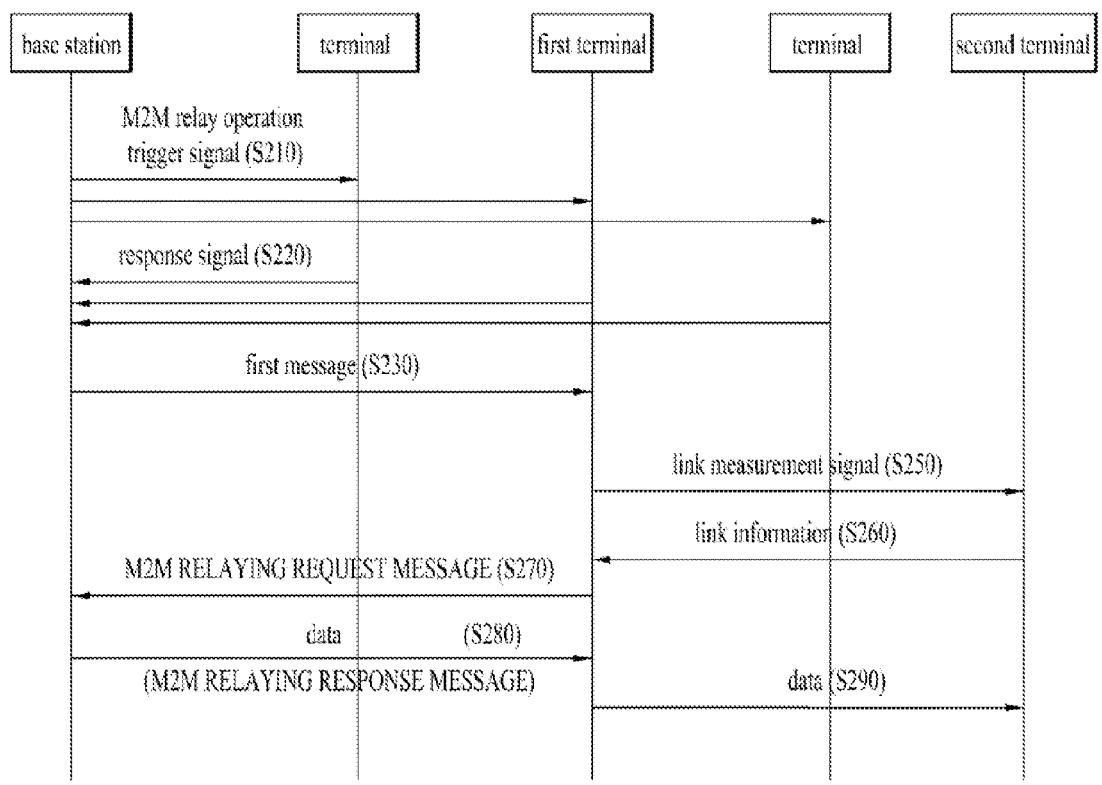
FIG. 4 illustrates an M2M communication procedure according to an embodiment of the present invention.

FIG. 4 illustrates an M2M communication procedure according to an embodiment of the present invention. Referring to FIG. 4, the base station may determine the first terminal that will perform data relay. This operation may be carried out when link establishment for data relay between terminals is not performed.

To determine the first terminal, the base station may transmit an M2M relay operation trigger signal to terminals in a cell (S210). The M2M relay operation trigger signal may include a message requesting the terminals in the cells to transmit information that can be used to determine the first terminal to the base station.

The base station may transmit the M2M relay operation trigger signal to the terminals in the cell using at least one of broadcast, multicast and unicast schemes.

Upon reception of the M2M relay operation trigger signal from the base station, each terminal may transmit a response signal to the base station in consideration of received signal power, capacity, current status, interference power or interference level, signal-to-interference ratio (SINR or SIR), etc. (S220).

The response signal may include information necessary to determine the first terminal.

For example, the response signal may include a channel quality indicator, channel state information, a signal-to-interference plus noise ratio, an interference level, path loss, and a relay support indicator.

Upon reception of the response signal, the base station may select the first terminal suitable to perform relay using the information included in the response signal. Upon selection of the first terminal suitable to perform relaying transmission, the base station may transmit a first message to the first terminal (S230). The first message may include a signal that instructs the first terminal to perform a relay operation.

Furthermore, the first message may include information necessary to construct frames and perform the relay operation. In addition, the first message may include a relay operation parameter and switching period information. The relay operation parameter may include information that instructs the first terminal to operate in one of a transmission mode and a reception mode in at least one of downlink and uplink sections in a frame.

The switching period information may include a predetermined period of switching the transmission mode or reception mode determined by the relay operation parameter. According to an embodiment of the present invention, the predetermined period may correspond to at least one of a frame, an integer multiple of a frame, a superframe, and an integer multiple of a superframe.

According to an embodiment of the present invention, the first message may include lower-layer terminal information, information about a switching gap, information about resource allocation, pilot signal information, connection ID for relay, flow ID for relay, group information (grouping ID, group indicator, number of groups) for relay, etc. According to an embodiment of the invention, the base station may transmit the first message to a second terminal.

According to an embodiment of the invention, by using the first message, a transmission mode characteristic and a reception mode characteristic in a frame may be set such that they are opposite to each other all the time between contiguous hops during transmission and reception of data between the base station and a terminal.

Alternatively, switching periods may be determined through the first message such that a terminal operates in the reception mode in a frame in which the terminal should read a superframe header including system information. For example, if a superframe includes frames 1, 2, 3 and 4, the first terminal can read a superframe header of the superframe at any time by operating in the reception mode, transmission mode, reception mode and transmission mode in frames 1, 2, 3 and 4, respectively.

Relay operation in a downlink section requires power consumption higher than that of relay operation in an uplink section. Furthermore, all terminals may need to simultaneously read a superframe header. Considering this, it is possible to instruct a terminal not to perform relay in the downlink section and to carry out relay only in the uplink section during transmission and reception of data between the base station and the terminal through the first message.

For example, all terminals can operate in a downlink section in a frame and the reception mode and the transmission mode can be switched on a frame-by-frame basis only in an uplink section in the frame. In this case, all the terminals can share system information from the base station and power loss can be reduced.

According to another embodiment of the invention, the first message may instruct all terminals to operate in the reception mode in a subframe including a superframe header and to alternatively operate in the transmission mode and the reception mode in subframes in other downlink sections.

Alternatively, the first message may be defined such that a specific subframe or a specific symbol can be transmitted between terminals to measure channel information between terminals.

All terminals may need to directly transmit signals to the base station. For example, terminals may simultaneously make entry to the coverage of the base station. For this, the first message may periodically or arbitrarily set an uplink section in which all terminals can simultaneously transmit signals to the base station. In this case, each terminal needs to have the capability to transmit signals to the base station as well as a higher terminal in the uplink section.

A data transmission/reception procedure using the first message will be described in detail below with reference to FIGS. 4 to 13.

Upon reception of the first message from the base station, the first terminal may be linked with the second terminal using the information included in the first message. To achieve this, the first terminal may transmit a link measurement signal to the second terminal first (S250). The link measurement signal may include a message requesting information necessary for link measurement. Upon reception of the link measurement signal, the second terminal may transmit link information measured according to the link measurement signal to the first terminal (S260). According to a first embodiment, the first terminal may directly set a link transmission parameter for a link using the link information transmitted from the second terminal.

When the first terminal directly sets the link transmission parameter, the first terminal may transmit an M2M relay request message to the base station after setting the link transmission parameter (S270). The M2M relay request message includes an indicator indicating that the first terminal is to be ready to perform M2M relay to the base station. Upon reception of the M2M relay request message, the base station may transmit data to the first terminal (S280). The first terminal may transmit the data to the second terminal (S290). The first terminal transmits, to the base station, a start time indicator, time offset, baseband request, and channel information (CQI, SINR, interface level information, etc.) between the first terminal and the base station, which are necessary to perform a relay operation, through the M2M relay request message. Upon reception of this information, the base station transmits data for relay at a requested time using the information, or transmits transmission start indication, bandwidth allocation, MCS, MIMO, power control information, etc. for data transmission through an M2M relay response message as a response signal for the received information, and then transmit the data.

According to a second embodiment of the invention, the first terminal may receive the link transmission parameter from the base station. In this case, the first terminal can transmit the M2M relay request message to the base station (S270). The M2M relay request message may include link measurement information (channel state, CQI, SINR, interference level, path loss) received from the second terminal and information for requesting information (start time, power control, MCS, MIMO, time offset, and allocation information) related to the link transmission parameter necessary to perform M2M relay. In addition, the M2M relay request message may include channel information between the first terminal and the base station. Upon reception of the M2M relay request message, the base station determines M2M relaying transmission using the information included in the M2M relay request message and transmits the link transmission parameter to the first terminal using the M2M relay response message when relay is performed. Here, the M2M relay response message includes a relay start time indicator (on a symbol-by-symbol, subframe-by-subframe, or frame-by-frame basis) and M2M relay confirmation information which represents whether a device performs a relay operation. The base station may send data to the first terminal after transmitting the M2M relay response message to the first terminal or simultaneously transmit the data and the M2M relay response message to the first terminal (S280). Then, the first terminal may transmit the data to the second terminal (S290).

Figure 5:
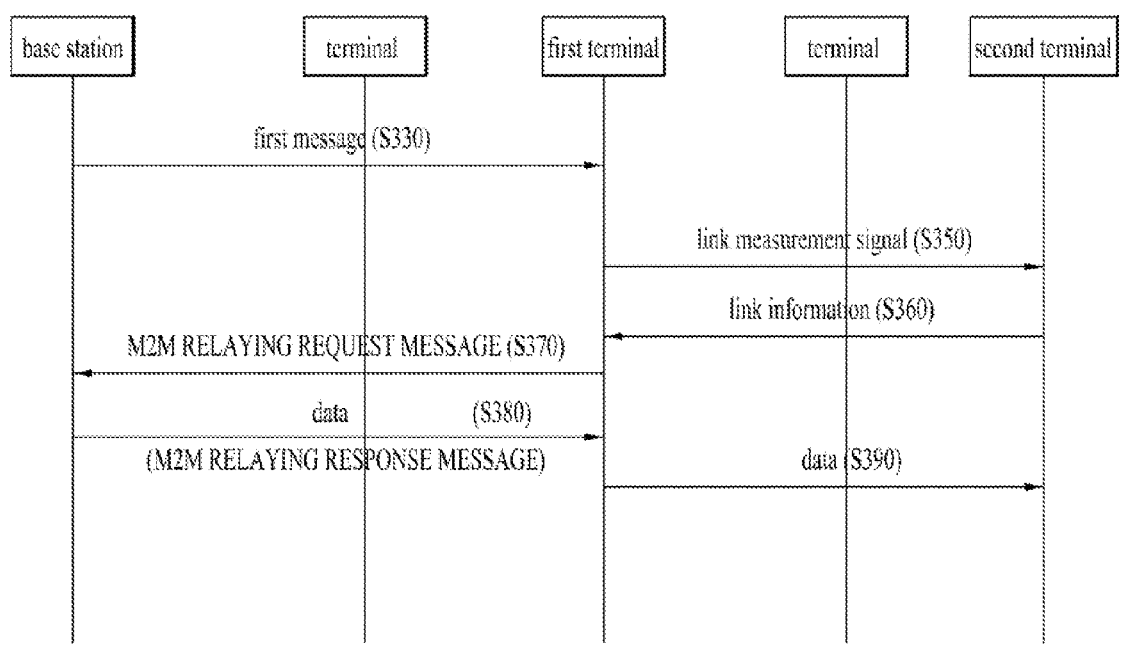
FIG. 5 illustrates an M2M communication procedure when a link for data relay is determined by a base station according to an embodiment of the present invention.

FIG. 5 illustrates an M2M communication procedure when a link for data relay is determined by the base station (when pairing/grouping of the second terminal is determined by the base station).

Referring to FIG. 5, the base station may determine a link for data relay and the procedure of determining the first terminal that will perform relay may be omitted according to an embodiment of the present invention. The first terminal may receive the first message from the base station (S330). The following steps correspond to the above-described steps, and thus description thereof is omitted.

A description will be given of a procedure of transmitting/receiving data among the base station, the first terminal and the second terminal, which focuses on frame construction and operations in consideration of M2M communication characteristics of intermittent data transmission, low mobility or no mobility (fixed), and latency insensitiveness, with reference to FIGS. 6 to 15. It is apparent that frame constructions shown in FIGS. 6 to 15 are part of the entire frame configuration and can be repeated.

Figure 6:
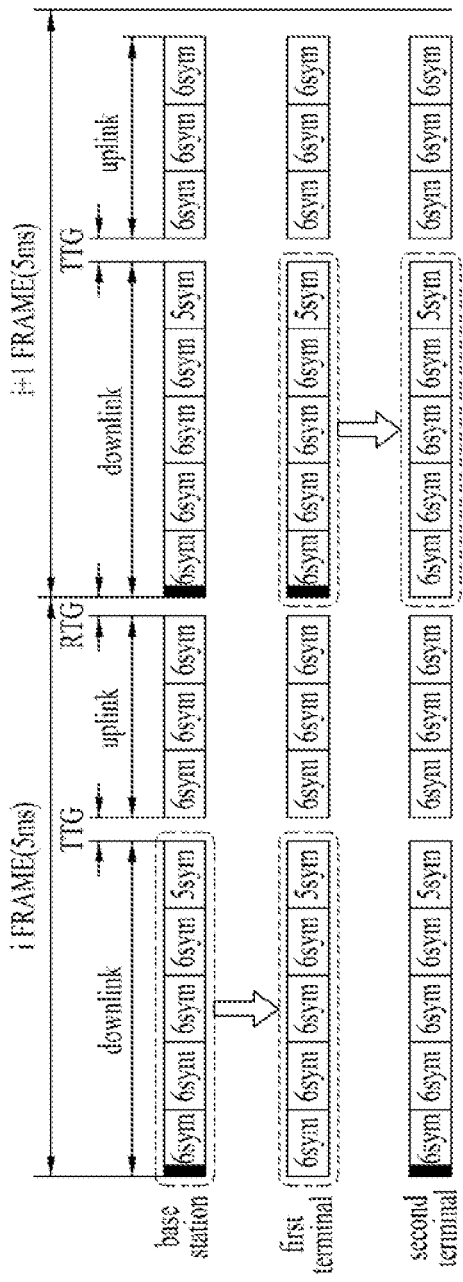
FIG. 6 illustrates operations of a base station and mobile terminals in a frame configuration in M2M communication according to an embodiment of the present invention.

FIG. 6 illustrates operations of the base station and terminals, performed on a frame-by-frame basis, in downlink sections in M2M communication. As shown in FIG. 6, according to an embodiment of the present invention, the first terminal can transmit/receive signals while being switched between the transmission mode and the reception mode on a frame-by-frame basis in downlink sections of frames. When the base station, the first terminal and the second terminal are connected in a hierarchical structure, the base station can transmit a signal to the first terminal connected thereto as a lower layer using a downlink section of an i-th frame.

In this case, the first terminal receives the signal transmitted from the base station using a conventional frame structure in the i-th frame. Here, the first terminal can operate in the reception mode in the downlink section of the i-th frame to receive the signal from the base station. Upon reception of the signal from the base station, the first terminal can transmit the signal to the second terminal using a downlink section of the next frame ((n+1)-th frame). Here, the reception mode is switched to the transmission mode in the downlink section of the (n+1)-th frame to transmit the signal to the second terminal.

According to the present embodiment of the invention, a Tx/Rx transmission gap (TTG) may not be needed, and an additional signal may be transmitted using the TTG. As described above, in the frame structure of the first terminal, the downlink section can be switched between the reception mode and the transmission mode on a frame-by-frame basis to transmit a signal to the second terminal.

Figure 7:
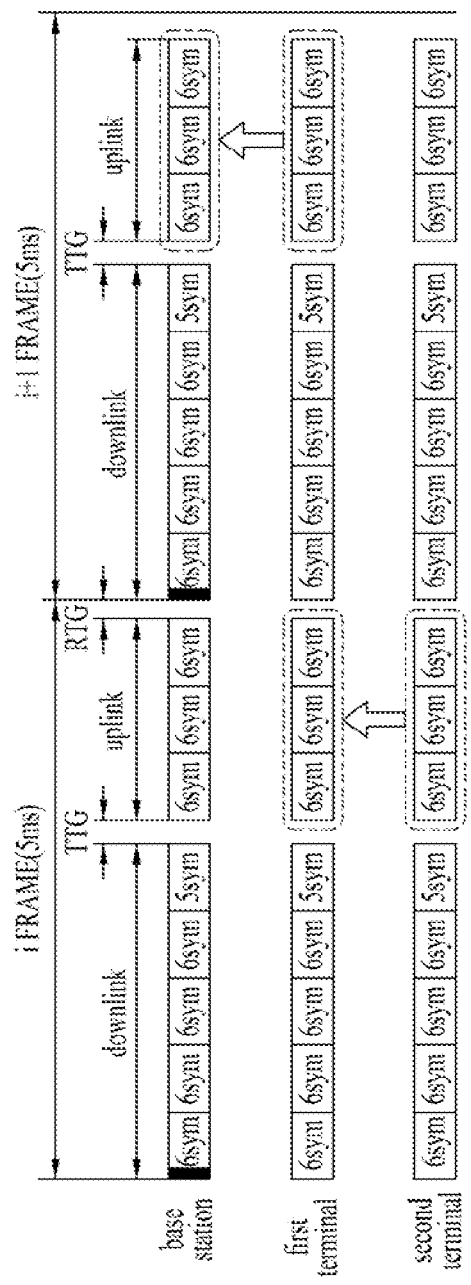
FIG. 7 illustrates operations of a base station and mobile terminals in a frame configuration according to another embodiment of the present invention.

FIG. 7 illustrates operations of the base station and terminals, performed on a frame-by-frame basis in uplink, in M2M communication.

As shown in FIG. 7, according to an embodiment of the present invention, the first terminal can transmit/receive signals while being switched between the transmission mode and the reception mode on a frame-by-frame basis in uplink sections of frames. When the base station, the first terminal and the second terminal are connected in a hierarchical structure, the second terminal can transmit a signal to the first terminal connected thereto as a higher layer using an uplink section of the i-th frame.

In this case, the first terminal receives the signal transmitted from the second terminal using the conventional frame structure in the i-th frame. Here, the first terminal can operate in the reception mode in the uplink section of the i-th frame to receive the signal from the second terminal. Upon reception of the signal from the second terminal, the first terminal can transmit the signal to the base station using an uplink section of the next frame ((i+1)-th frame).

Here, the reception mode can be switched to the transmission mode in the uplink section of the (i+1)-th frame to transmit the signal to the second terminal.

According to the present embodiment of the invention, an Rx/Tx transmission gap (RTG) may not be needed. Otherwise, an additional signal may be transmitted using the RTG.

As described above, in the frame structure of the first terminal, reception mode/transmission mode switching can be performed in uplink sections on a frame-by-frame basis to transmit a signal to the base station.

When the downlink section and the uplink section of the conventional frame structure are used for M2M communication, as illustrated in FIGS. 6 and 7, the first terminal that transmits/receives signals to/from the base station and the second terminal switches between the transmission mode and the reception mode in the downlink section or uplink section.

According to an embodiment of the present invention, transmission mode/reception mode switching may be performed on a frame-by-frame basis in a superframe or carried out for every N frames. Here, N may be 2, 3 or 4.

According to an embodiment of the invention, transmission mode/reception mode switching may be performed on a superframe-by-superframe basis or for a multiple of a superframe. Otherwise, transmission mode/reception mode switching may be carried out using a ratio of transmission mode frames to reception mode frames in a subframe. Switching periods may be appropriately selected in consideration of an M2M communication role.

While FIGS. 6 and 7 show a case in which the base station, the first terminal and the second terminal are connected through two hops, an M2M terminal can transmit data to another M2M terminal using the above-described method when a plurality of terminals are connected through multiple hops.

Figure 8:
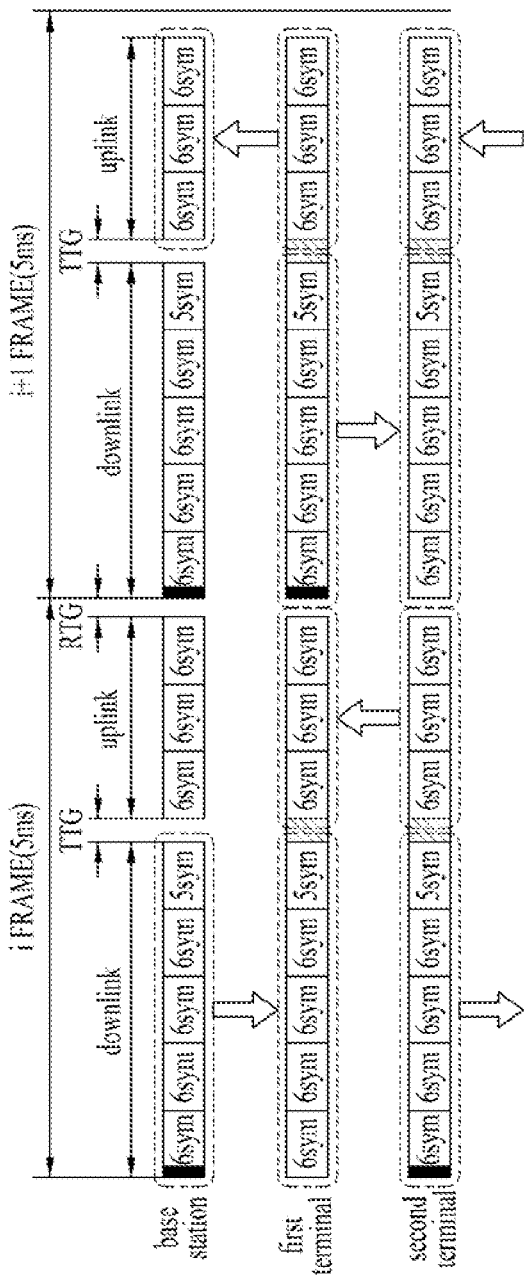
FIG. 8 illustrates operations of a base station and mobile terminals in a frame configuration in M2M communication according to another embodiment of the present invention.

FIG. 8 corresponds to a combination of FIGS. 6 and 7 and shows a case in which the first terminal operates in the reception mode in both downlink and uplink sections in the i-th frame and operates in the transmission mode in both downlink and uplink sections in the (i+1)-th frame, whereas the second operates in the transmission mode in both downlink and uplink sections in the i-th frame and operates in the reception mode in both downlink and uplink sections in the (i+1)-th frame.

That is, the terminals can switch between the transmission mode and the reception mode on a frame-by-frame basis or for a multiple of a frame and, in the case of FIG. 8, modes corresponding to neighboring hops may be opposite to each other all the time. Referring to FIG. 8, the first terminal may receive signals from the base station and the second terminal in the i-th frame using the downlink section and the uplink section of the i-th frame.

Accordingly, a TTG that is set for downlink/uplink section switching can be allocated to a signal transmission period and used for signal transmission. That is, for the first terminal, both downlink and uplink sections of all frames are in one of the reception mode and the transmission mode, and thus the TTG can be assigned for signal transmission. Furthermore, switching order of the transmission mode and the reception mode may be set according to a hop to which a terminal is linked.

Figure 9:
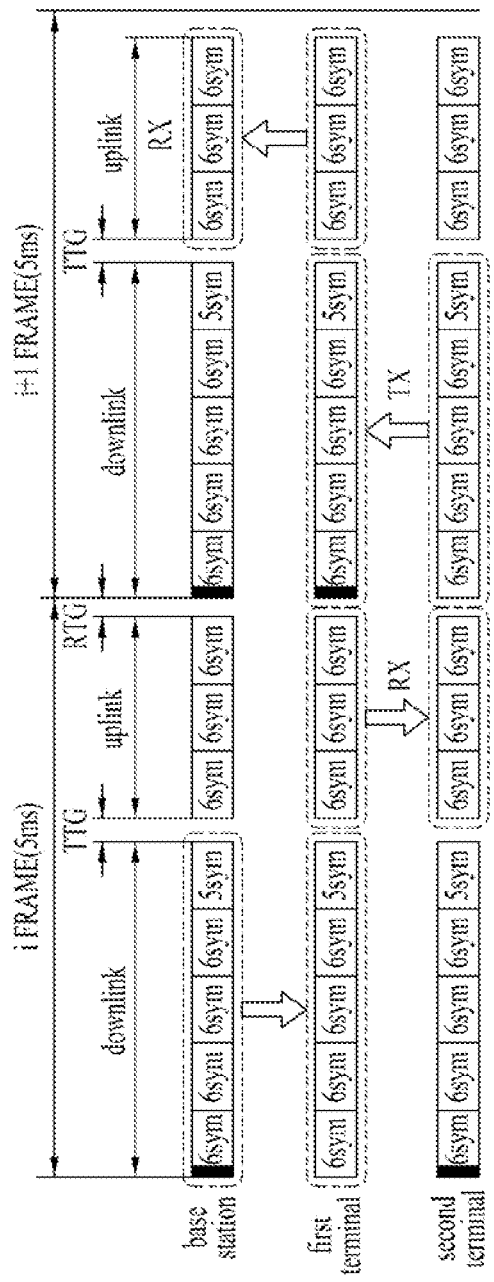
FIG. 9 illustrates operations of a base station and mobile terminals in a frame configuration in M2M communication according to another embodiment of the present invention.

FIG. 9 shows a frame structure in which the first terminal receives a signal from the base station in the downlink section of the i-th frame, transmits the signal received from the base station to a lower terminal in the uplink section of the i-th frame, receives a signal from the lower terminal in the downlink section of the (n+1)-th frame, and transmits the signal received from the lower terminal to the base station in the uplink section of the (i+1)-th frame.

Referring to FIG. 9, the first terminal may operate in the reception mode to receive the signal from the base station in the downlink section of the i-th frame and operate in the transmission mode to transmit the received signal to the second terminal in the uplink section of the i-th frame. According to an embodiment of the present invention, reception of the signal from the base station and transmission of the signal to the second terminal may be performed in the same frame or in several frames.

The first terminal may operate in the reception mode to receive a signal from the second terminal in the downlink section of the (i+1)-th frame and operate in the transmission mode to transmit the received signal to the base station in the uplink section of the (i+1)-th frame. The second terminal may operate in the transmission mode to transmit a signal to another terminal in the downlink section of the i-th frame, operate in the reception mode to receive a signal from the first terminal in the uplink section of the i-th frame, operate in the transmission mode to transmit a signal to the first terminal in the downlink section of the (i+1)-th frame and operate in the reception mode to receive a signal from the other terminal in the uplink section of the (i+1)-frame.

That is, the second terminal can operate in modes opposite to the modes in which the first terminal operates to transmit a signal to the other terminal in the downlink section of the i-th frame and to receive a signal from the first terminal in the uplink section of the i-th frame. Furthermore, the second terminal can operate in the transmission mode in the downlink section of the (i+1)-th frame to transmit a signal to the first terminal and operate in the reception mode in the uplink section of the (i+1)-th frame to receive a signal from a lower terminal.

To transmit a signal in a hierarchical manner, a terminal at each layer can switch between the reception mode and the transmission mode in the downlink/and uplink section of a frame for each hop. According to an embodiment of the present invention, switching the downlink/uplink section of a frame to the reception mode/transmission mode or to transmission mode/reception mode can be performed on a frame-by-frame basis, a superframe-by-superframe basis, for a plurality of frames, or for a plurality of superframes. Furthermore, transmission/reception of a signal between terminals or between a terminal and the base station can be performed in one frame, in a plurality of frames, in one superframe, or in a plurality of superframes.

Figure 10:
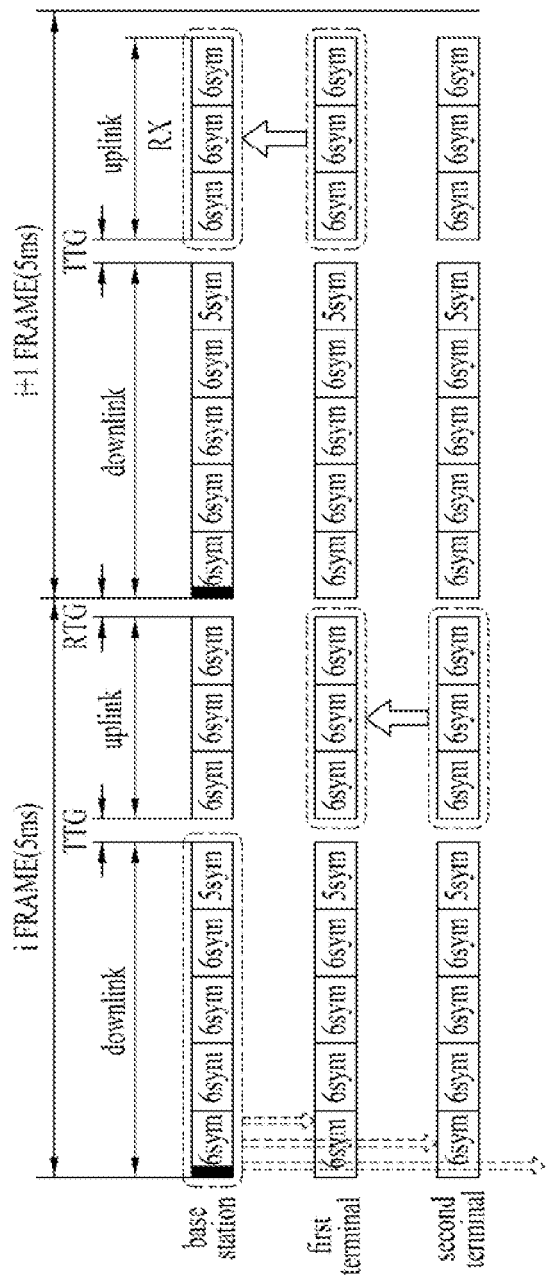
FIG. 10 illustrates operations of a base station and mobile terminals in a frame configuration in M2M communication according to another embodiment of the present invention.

FIG. 10 illustrates an embodiment in which a terminal receives a signal from the base station using a downlink section and transmits a signal to a higher layer using only an uplink section in order to perform M2M relay.

Referring to FIG. 10, all terminals in the coverage of the base station may directly receive a signal from the base station in the downlink section of the i-th frame and operate in the reception mode or transmission mode in the uplink section of the i-th frame. Each terminal can receive relay control information such as switching information related to relay and resource allocation information from the base station through a DL frame. In the frame structure shown in FIG. 10, the terminals receive a signal from the base station through a downlink section, and thus it is not necessary to additionally perform synchronization of terminals for signal transmission. Furthermore, since each terminal receives information necessary for signal transmission from the base station, it is not necessary for each terminal to transmit a message to a lower terminal.

The aforementioned data transmission/reception methods focus on a frame having a downlink section and an uplink section that are not divided into an access zone and a relay zone. A description will be given of methods for transmitting/receiving data in a frame having a downlink section and an uplink section that are divided into an access zone and a relay zone with reference to FIGS. 11 to 15.

When a plurality of M2M terminals is connected in a hierarchical manner, the base station and M2M terminal may use the conventional relay frame structure to transmit signals to the M2M terminals. For example, an M2M terminal can transmit a signal to another M2M terminal using the relay frame structure of IEEE 802.16m.

In this case, the M2M terminals and the base station have the same frame structure in a downlink section. That is, an M2M terminal can transmit a signal to another M2M terminal through transmission mode/reception mode switching on a frame-by-frame or superframe-by-superframe basis in a downlink section, as shown in FIG. 6.

Figure 11:
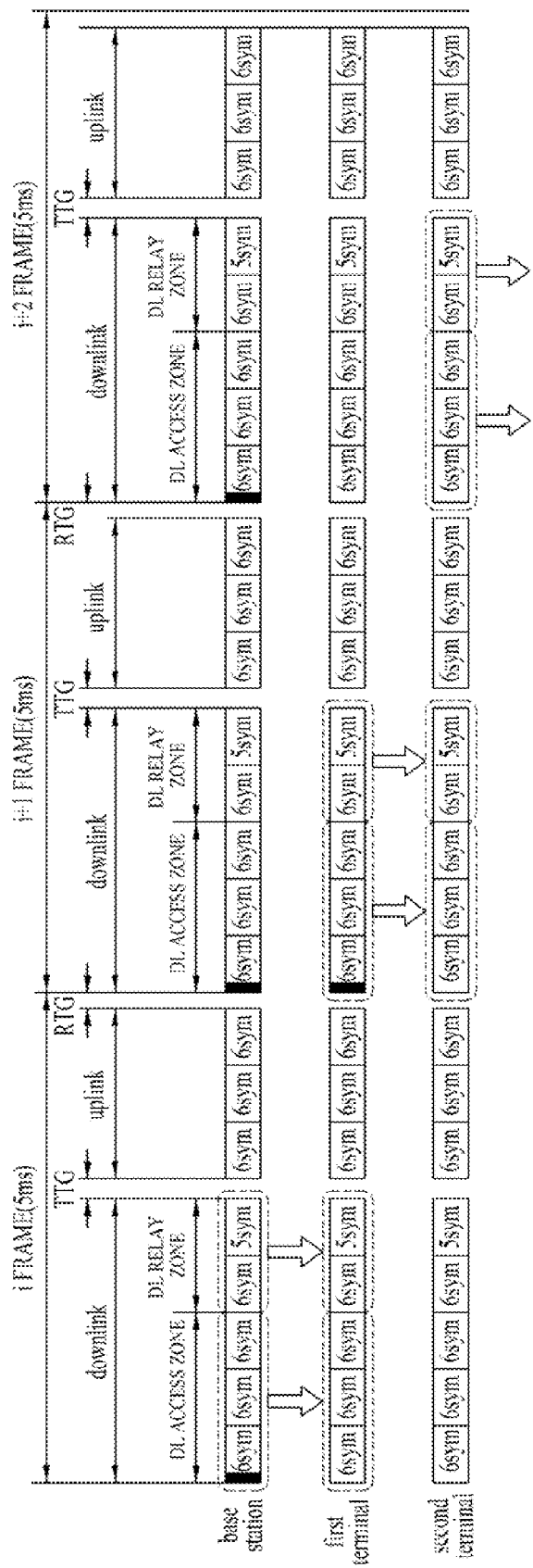
FIG. 11 illustrates operations of a base station and mobile terminals in a frame configuration in M2M communication according to another embodiment of the present invention.
Figure 12:
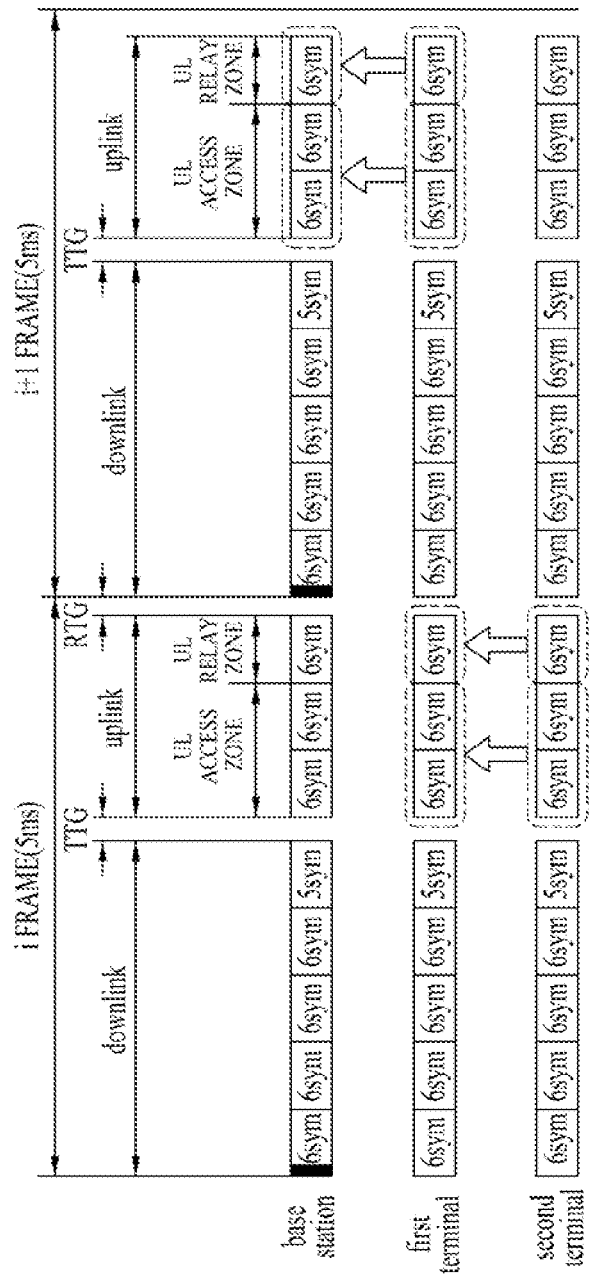
FIG. 12 illustrates operations of a base station and mobile terminals in a frame configuration in M2M communication according to another embodiment of the present invention.

Referring to FIG. 11 and FIG. 12, the base station can divide a downlink section of a frame into an access zone and a relay zone and use the access zone and relay zone for relay. M2M terminals can also divide the downlink section of a frame into an access zone and a relay zone. Here, the access zone and the relay zone shown in FIG. 11 are exemplary and can be differently defined in the frame structure for the M2M terminals.

FIG. 11 illustrates a method of transmitting, by the base station, a signal in a downlink section to the second terminal through the first terminal by dividing the downlink section into two zones.

As shown in FIG. 11, the first terminal functioning as a relay for transmitting a signal to the second terminal may receive, from the base station, a signal related to the first terminal through the access zone of the downlink section of the i-th frame and receive a signal to be transmitted to the second terminal through the relay zone of the downlink section of the i-th frame.

Upon reception of the signal related to the first terminal and the signal to be transmitted to the second terminal from the base station, the first terminal may transmit signals to the second terminal using the access zone and the relay zone of the downlink section of the next frame ((i+1)-th frame) in the same manner in which the base station transmits signals to the first terminal. In this case, the downlink section of the (i+1)-th frame is switched from the reception mode to the transmission mode. According to an embodiment of the present invention, the first terminal may receive signals transmitted through the zones in the downlink section from the base station without discriminating between the signals by zone.

The first terminal may transmit signals to the second terminal by changing the access zone and the relay zone. Specifically, the first terminal may transmit a signal for another terminal connected to the second terminal using the access zone of the downlink section of the (i+1)-th frame and transmit a signal for the second terminal using the relay zone of the downlink section of the (i+1)-th frame.

If the first terminal has a signal to be transmitted to the other terminal connected to the second terminal without having data to be transmitted to the second terminal although the first terminal has received signals from the base station through the access zone and the relay zone of the downlink section, the first terminal may transmit the signal using only the relay zone of the downlink section. In this case, the second terminal that has received a signal from the first terminal may transmit the signal to the other terminal using only the relay zone if the signal is not information about the other terminal.

FIG. 12 illustrates a method of transmitting, by the second terminal, a signal in an uplink section to the base station through the first terminal by dividing the uplink section into two zones.

As shown in FIG. 12, the first terminal functioning as a relay for transmitting a signal to the base station may receive a signal related the first terminal through the access zone of the uplink section of the i-th frame and receive a signal to be transmitted to the base station through the relay zone of the uplink section of the i-th frame. The first terminal may receive signals transmitted through the access zone and the relay zone in the uplink section from the base station without discriminating between signals by zone.

Upon reception of the signal related to the first terminal and the signal to be transmitted to the base station from the second terminal, the first terminal may transmit signals to the base station using the access zone and the relay zone of the uplink section of the next frame ((i+1)-th frame) in the same manner in which the second terminal transmits signals to the first terminal.

In this case, the uplink, section of the (i+1)-th frame is switched from the reception mode to the transmission mode. Here, it is possible to use the uplink section without discriminating between the access zone and the relay zone.

Figure 13:
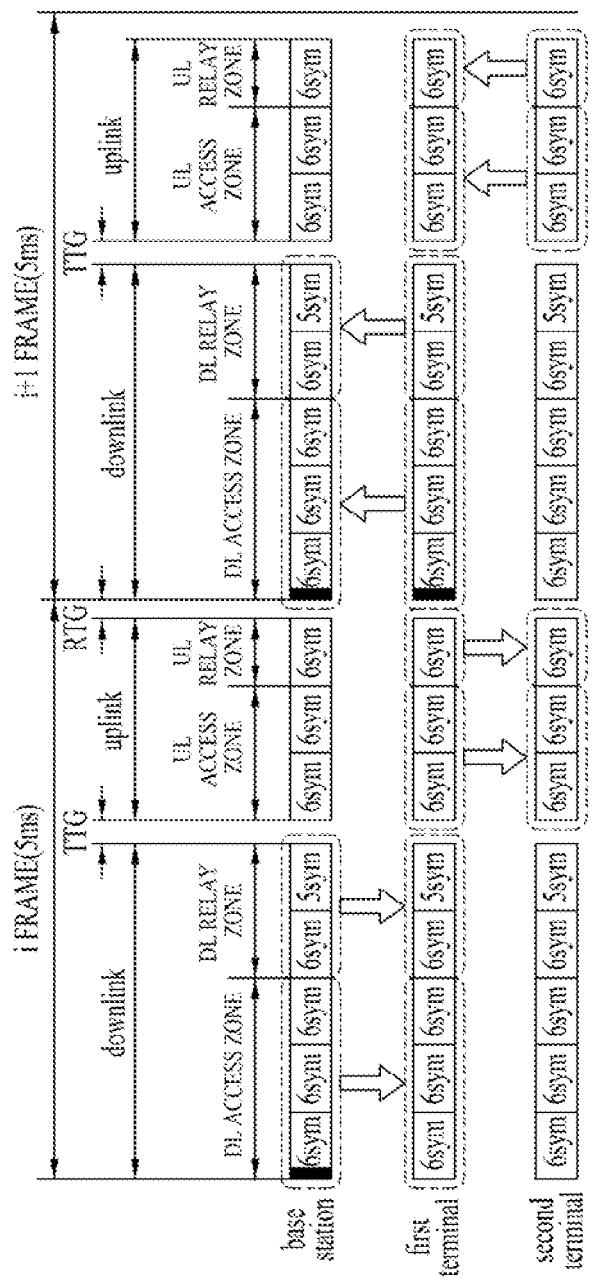
FIG. 13 illustrates operations of a base station and mobile terminals in a frame configuration in M2M communication according to another embodiment of the present invention.

FIG. 13 illustrates a method of transmitting/receiving data using a frame structure having a downlink section and an uplink section each of which is divided into an access zone and a relay zone.

Referring to FIG. 13, the first terminal receives a signal from the base station through the access zone and the relay zone of the downlink section of the i-th frame, transmits the signal received from the base station to the second terminal through the access zone and the relay zone of the uplink section of the i-th frame, transmits a signal to the base station through the access zone and the relay zone of the downlink section of the (i+1)-th frame and receives a signal from the second terminal through the access zone and the relay zone of the uplink section of the (i+1)-th frame.

The first terminal may operate in the reception mode to receive a signal from the base station in the downlink section of the i-th frame and operate in the transmission mode to transmit the received signal to the second terminal in the uplink section of the i-th frame.

Furthermore, the first terminal may operate in the transmission mode to transmit a signal to the base station in the downlink section of the (i+1)-th frame and operate in the reception mode to receive a signal from the second terminal in the uplink section of the (i+1)-th frame.

According to an embodiment of the present invention, reception of a signal from the base station and transmission of a signal to the second terminal may be performed in the same frame or in several frames. Furthermore, transmission mode/reception mode switching in the downlink/uplink section may be performed on a frame-by-frame basis, a superframe-by-superframe basis, for a plurality of frames, or for a plurality of superframes.

In addition, since the base station or the terminals use the two zones for different purposes, different information may be transmitted through respective zones for signal transmission. The information used for signal transmission may include a pilot pattern, a reference signal, and control channel information (feedback, hybrid automatic repeat request (HARQ), bandwidth request (BR)).

Figure 14A:
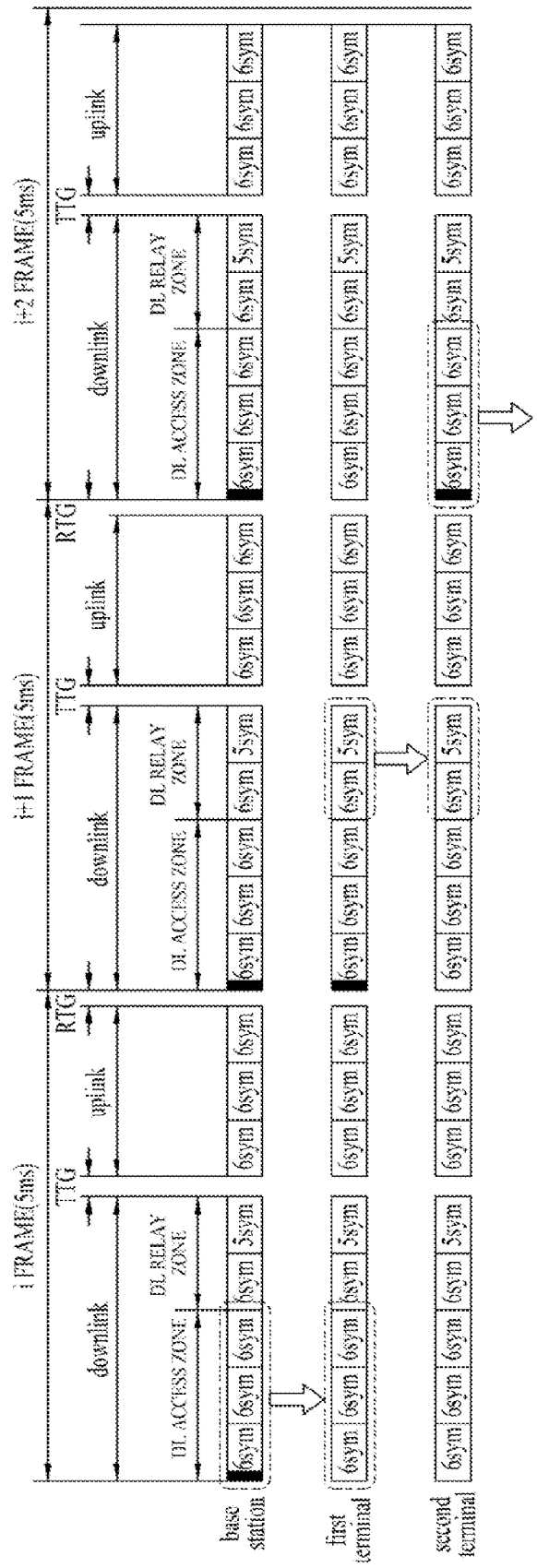
FIGS. 14(a) and 14(b) illustrate operations of a base station and mobile terminals in a frame configuration in M2M communication according to another embodiment of the present invention.
Figure 14B:
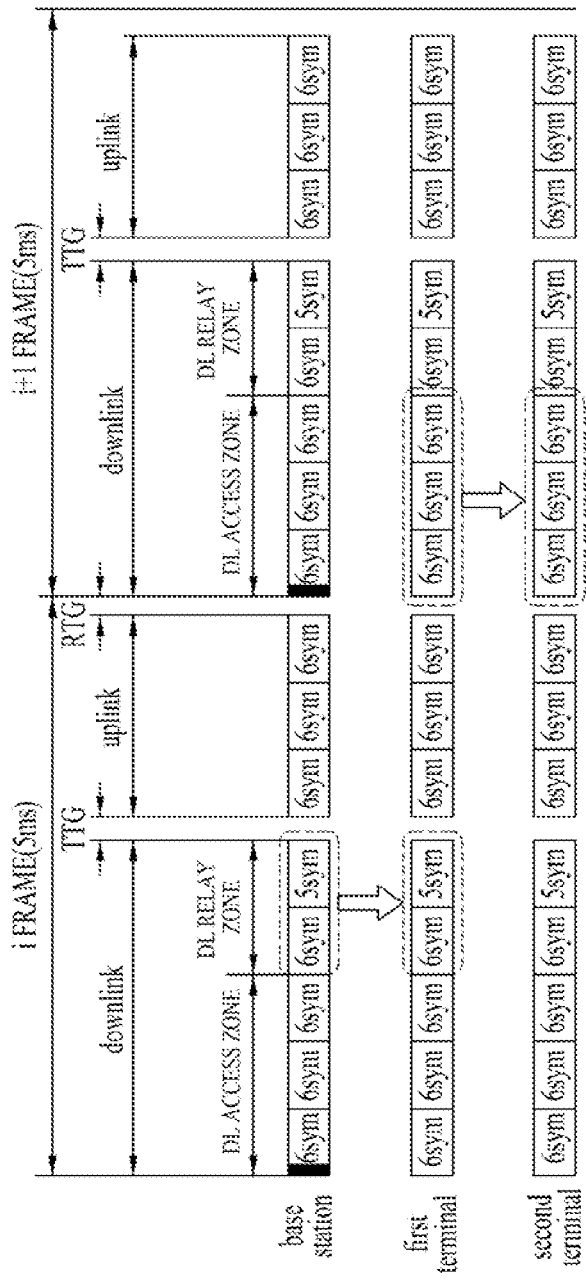

FIGS. 14(a) and 14(b) illustrate a method of transmitting/receiving a signal using only a downlink section according to another embodiment of the present invention.

Referring to FIG. 14(a), the first terminal receives a signal related thereto and a signal related to a lower terminal (second terminal) from the base station through an access zone of a downlink section of a frame. The first terminal may transmit the signal to the second terminal through a relay zone of the next frame or a relay zone of a frame at a predetermined interval. Upon reception of the signal from the first terminal, the second terminal may transmit a signal to a lower terminal using an access zone in the same manner in which the base station transmits signals to the first terminal. For example, the second terminal located in the second hop can transmit a signal to the lower terminal using the same frame structure as that of the base station.

Referring to FIG. 14(b), the base station may transmit a signal to the first terminal using a relay zone. Upon reception of the signal from the base station, the first terminal may use an access zone to transmit a signal to a lower terminal. In this case, the access zone used for the first terminal to transmit a signal to a lower terminal may be composed of one frame, a plurality of frames, one superframe, or a plurality of superframes.

Figure 15A:
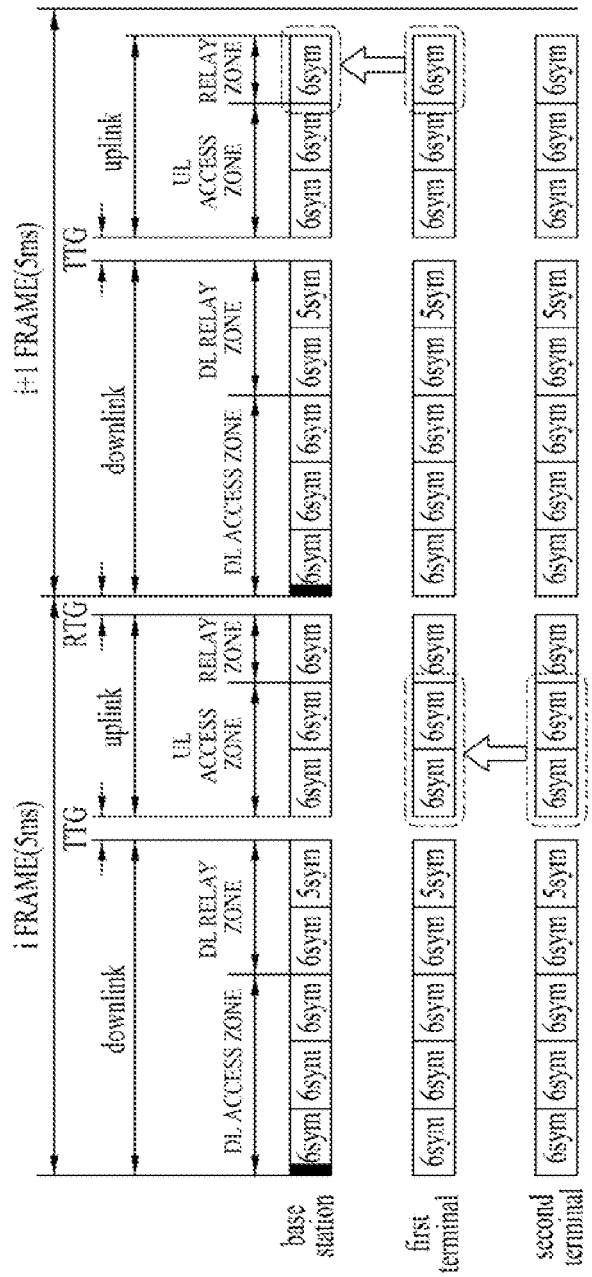

FIGS. 15(a) and 15(b) illustrate a method of transmitting/receiving a signal using only an uplink section.

The signal transmission/reception method of FIG. 15 corresponds to the signal transmission/reception method of FIG. 14 except that the signal transmission/reception method of FIG. 15 uses only an uplink section instead of a downlink section, and thus detailed description thereof is omitted. Referring to FIG. 15, a lower terminal may transmit a signal to a higher terminal or the base station using an access zone or a relay zone. When a terminal receives the signal, the terminal may transmit the signal to the base station or a higher terminal using a relay zone or an access zone.

The data transmission/reception methods illustrated in FIGS. 6 to 15 correspond to part of the preset invention, and some of the above-mentioned methods of transmitting/receiving a signal in a downlink/uplink section may be combined to transmit/receive data.

According to an embodiment of the present invention, the above-described methods may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer may include a controller of a mobile terminal.

It is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for performing a relay operation by a terminal in a wireless access system, the method comprising:
   receiving a relay operation trigger signal from a base station, the relay operation trigger signal used for requesting terminals within a cell of the base station to provide the base station with information which is to be used by the base station to determine, among the terminals, a relay terminal that will perform the relay operation;
   transmitting a response signal to the base station, the response signal including the information requested by the base station, the information used by the base station to determine, among the terminals, the relay terminal that will perform the relay operation;
   receiving a first message including an indicator which instructs the terminal to perform the relay operation and a relay operation parameter from the base station; and
   performing the relay operation between the base station and a second terminal based on the received relay operation parameter, wherein the relay operation parameter is information that indicates a transmitting operation or a receiving operation in at least one of a downlink section and an uplink section in a frame, wherein the first message further includes switching period information that indicates switching of the transmitting operation or receiving operation determined by the relay operation parameter on a frame-by-frame basis or superframe-by-superframe basis, wherein the relay operation parameter indicates a receiving operation to receive data from the base station in a downlink section of a first frame, and the transmitting operation to transmit the data received in the downlink section of the first frame to the second terminal in a downlink section of a second frame, and wherein the downlink section is divided into a downlink access zone and a downlink relay zone, and a signal to be transmitted to the second terminal is received through the downlink relay zone.

2. The method according to claim 1, wherein the terminals are M2M terminals that support M2M communication.

3. The method according to claim 1, wherein the first message includes at least one of information about a lower terminal, information about a switching gap, information about resource allocation, pilot signal information, connection ID for relay, or flow ID for relay, in the case of multi-hop relay.

4. The method according to claim 1, wherein the response signal includes at least one of a channel quality indicator, channel state information, a signal-to-interference plug noise ratio, an interference level, path loss, or a relay support indicator.

5. The method according to claim 1, further comprising:
transmitting a link measurement signal to the second terminal;
receiving link information measured according to the link measurement signal from the second terminal;
setting a link transmission parameter on the basis of the received link information; and
transmitting an M2M relay request message to the base station,
wherein the M2M relay request message includes an M2M relay confirmation indicator indicating that the terminal is ready to perform M2M relay.

6. The method according to claim 1, further comprising:
transmitting a link measurement signal to the second terminal;
receiving link information measured according to the link measurement signal from the second terminal;
transmitting the received link information to the base station through an M2M relay request message; and
receiving an M2M relay response message from the base station,
wherein the M2M relay response message includes a link transmission parameter and an M2M relay confirmation indicator indicating that the terminal is ready to perform M2M relay.

7. A terminal performing a relay operation in a wireless access system, the terminal comprising:
an RF communication unit for transceiving an RF signal; and
a controller connected to the RF communication unit,
wherein the controller controls the RF communication unit to
receive a relay operation trigger signal from a base station, the relay operation trigger signal used for requesting terminals within a cell of the base station to provide the base station with information which is to be used by the base station to determine, among the terminals, a relay terminal that will perform the relay operation;
transmitting a response signal to the base station, the response signal including the information requested by the base station, the information used by the base station to determine, among the terminals, the relay terminal that will perform the relay operation;
receive a first message including an indicator which instructs the terminal to perform the relay operation and a relay operation parameter from a base station, and
performing the relay operation between the base station and a second terminal based on the received relay operation parameter,
wherein the relay operation parameter is information that indicates a transmitting operation or a receiving operation in at least one of a downlink section and an uplink section in a frame,
wherein the first message further includes switching period information that indicates switching of the transmitting operation or receiving operation determined by the relay operation parameter on a frame-by-frame basis or superframe-by-superframe basis,
wherein the relay operation parameter indicates a receiving operation to receive data from the base station in a downlink section of a first frame, and the transmitting operation to transmit the data received in the downlink section of the first frame to the second terminal in a downlink section of a second frame, and
wherein the downlink section is divided into a downlink access zone and a downlink relay zone, and a signal to be transmitted to the second terminal is received through the downlink relay zone.

8. The terminal according to claim 7, wherein the terminal and the second terminal are M2M terminals.

* * * * *